(12) United States Patent
Hutton

(10) Patent No.: US 6,609,730 B1
(45) Date of Patent: Aug. 26, 2003

(54) STABILIZED MOUNTING ASSEMBLY WITH INTEGRAL BLOCK MODULE AND MANIFOLD/TRANSMITTER MODULE

(75) Inventor: Peter B. Hutton, Houston, TX (US)

(73) Assignee: Century Industries Company, Halifax (CA)

( * ) Notice: Subject to any disclaimer, the term of this patent is extended or adjusted under 35 U.S.C. 154(b) by 0 days.

(21) Appl. No.: 09/674,356

(22) PCT Filed: Feb. 28, 2000

(86) PCT No.: PCT/US00/05026
§ 371 (c)(1),
(2), (4) Date: Oct. 31, 2000

(87) PCT Pub. No.: WO00/52375
PCT Pub. Date: Sep. 8, 2000

Related U.S. Application Data

(60) Provisional application No. 60/138,535, filed on Jun. 10, 1999, and provisional application No. 60/123,175, filed on Mar. 5, 1999.

(51) Int. Cl.[7] .................... F16L 23/00; F16L 35/00
(52) U.S. Cl. .................. 285/114; 285/143.1; 285/219
(58) Field of Search ......................... 285/18, 61, 114, 285/219, 143.1; 73/756

(56) References Cited

U.S. PATENT DOCUMENTS

| 2,238,169 A | 4/1941 | Heyn et al. |
| 4,467,864 A | 8/1984 | Crist |
| 4,889,369 A | 12/1989 | Albrecht |
| 4,920,626 A | 5/1990 | Nimberger |
| 5,292,155 A | 3/1994 | Bell et al. |
| 5,533,765 A | 7/1996 | Williamson et al. |

Primary Examiner—Eric K. Nicholson
(74) Attorney, Agent, or Firm—Stevens Davis, LLP

(57) ABSTRACT

A stabilized mounting assembly (15) and method for sensing pressure in a conduit, such as a pipeline, is disclosed wherein the load on the NPT threaded taps (31) is reduced and transferred from the NTP threads.

20 Claims, 8 Drawing Sheets

STABILIZED MOUNTING ASSEMBLY WITH INTEGRAL BLOCK MODULE AND MANIFOLD/TRANSMITTER MODULE

This application claims the benefit of Provisional application Ser. No. 60/123,175, filed Mar. 5, 1999, and 60/138,535, filed Jun. 10, 1999.

BACKGROUND OF THE INVENTION

1. Field of the Invention

This invention relates to the remote sensing of pressure drops across an orifice plate in a pipeline and particularly to an orifice saddle to facilitate, stabilize and reduce vibration of the transmitter and associated apparatus, such as valved manifold blocks connecting the transmitter to taps straddling the orifice plate.

2. Description of the Related Art

The gas industry makes extensive use of orifice plates for volume measurements. Orifice plates are artificial constrictions in a pipeline. As a result of this constriction there is a pressure drop from the upstream side of the orifice plate to the downstream side of the orifice plate. There is a relationship between the pressure drop and the amount of gas flowing through the pipeline. The pressure drop can be measured which in turn allows a determination of the flow through the pipeline.

The pressure drop is measured using electronic transmitters. These transmitters actually measure the pressures on both the upstream and downstream sides of the orifice plate and then record the difference between the two. Devices of this type are referred as differential pressure transmitters. There are numerous manufacturers of this type of device (e.g. Rosemount, Honeywell, Foxboro and others).

Orifice plate fittings (such as the type manufactured by Daniel Industries) and orifice flanges (manufactured by Daniel and others) are provided with holes (called taps) both upstream and downstream of the orifice plate. The taps are generally threaded holes, typically ½" female NPT (National Pipe Thread—a tapered thread designed to seal pressure tight).

It is necessary to incorporate valving systems between the orifice taps and the differential pressure transmitters. These valving systems need to include the following functions. Block valves to isolate the flow through the upstream and downstream taps (generally referred to as the high pressure side and the low pressure side), between the orifice flange or fitting and the transmitter. An equalizer valve, or valves, to control the connection between the high pressure passages and the low pressure passages. A vent valve, or valves, to allow trapped pressures to be bled off or to allow the passages to be purged of entrapped gases or liquids. Sometimes the vent valve(s) are incorporated into the transmitters.

The natural gas industry has evolved a number of specifications and requirements to minimize errors in the measurement of flow and to provide improved accuracy and response time. Some of these are:

1. The closer the transmitter is to the orifice plate the better.

2. The orifice size through the valving system from the orifice taps to the transmitter must be ⅜" in diameter.

3. The flow passages between the orifice taps to the transmitter should be as straight as possible. The ideal is a straight through passage. One 90 degree turn in the flow passage is permitted.

Another consideration is mounting the valve system and the transmitters to the orifice plate assembly. Conventional mounting, valving, and transmitter assemblies can weigh 40 pounds and, depending on the complexity of the assembly and the products used, up to 70 pounds. The pipeline system and the orifice flanges or fittings are subject to vibration. The valving and transmitter assemblies also tend to be leaned on by the instrumentation personnel. It is necessary to spread the loads arising from these factors off of the typical ½" NPT tap connections and transfer the loads onto the orifice fitting or flange. Currently available products use individual taps with attachments to spread the load. These are called stabilized connection flanges or stabilized futbol flanges. An example of such a stabilized connector flange is shown in U.S. Pat. No. 4,920,626 assigned to Precision General, Inc. of Houston, Tex.

In this patent is provided a stabilizer foot which is a generally parallelpiped body portion and/or containing pair of stabilizer feet attached to the body portion which feet project axially toward the orifice plate assembly. The body portion is provided with a bore through which is fitted an NPT threaded connector flange so that the body and/or the stabilizer feet are radially outward of the NPT threads and provide outriggers for engagement with the external surface of the orifice plate assembly.

However, if the orifice plate assembly is curved the body and/or stabilizer feet only make point contact along the curved surface. The provision of a flat boss on the orifice plate assembly will increase the contact with the parallelpiped body surface and/or projecting stabilizer feet but then the requirement of a planar boss limits the applicability of the usage of the device in U.S. Pat. No. 4,920,626 to only certain types of orifice fittings.

Notwithstanding the use of the device of U.S. Pat. No. 4,920,626 on the limited planar or curved surfaces, the shear forces exerted by the dead load of the transmitters (and any associated block manifolds) and live load exerted by instrumentation personnel leaning on the transmitter (and block manifold) will be borne by the NPT threads tending to disturb the seal between the threads and the orifice taps, resulting in the possibility of leaks.

Thus, there is a continuing need to provide an alternative connection method and apparatus to operatively fluidly couple the high and lower pressure taps about an orifice plate with a transmitter.

SUMMARY OF THE INVENTION

The present invention is directed to a method and apparatus for operatively fluidly connecting the high and low pressure taps of an orifice plate with a transmitter.

In a particularly preferred embodiment an orifice saddle is provided which orifice saddle preferably has one round hole and one elongated hole, though two round holes can be provided.

The threaded end of the taps are inserted through these holes and tightened into the ½" NPT holes of the orifice fittings or orifice flange. The end of the taps, distal from the threaded end tightened into the ½" NPT holes, is known as the "hex end" due to their configuration and are larger than the threaded end.

The saddle is forced outward of the taps toward the hex end by a series of adjustable feet which may take the form of adjustable stabilizing bolts extending from the saddle toward the orifice assembly.

This forcing places the taps in tension and forms a stable platform to attach the rest of the assembly. Any further live or dead loads are carried by the stabilizer bolts.

When the nature of the orifice fitting does not provide a sufficient area upon which the stabilizer bolts may bear, in a further embodiment of the invention a lower plate may be provided to increase the area of the orifice fitting assembly upon which the adjustable stabilizing bolts may bear.

DESCRIPTION OF THE PREFERRED EMBODIMENTS

Figure 1:
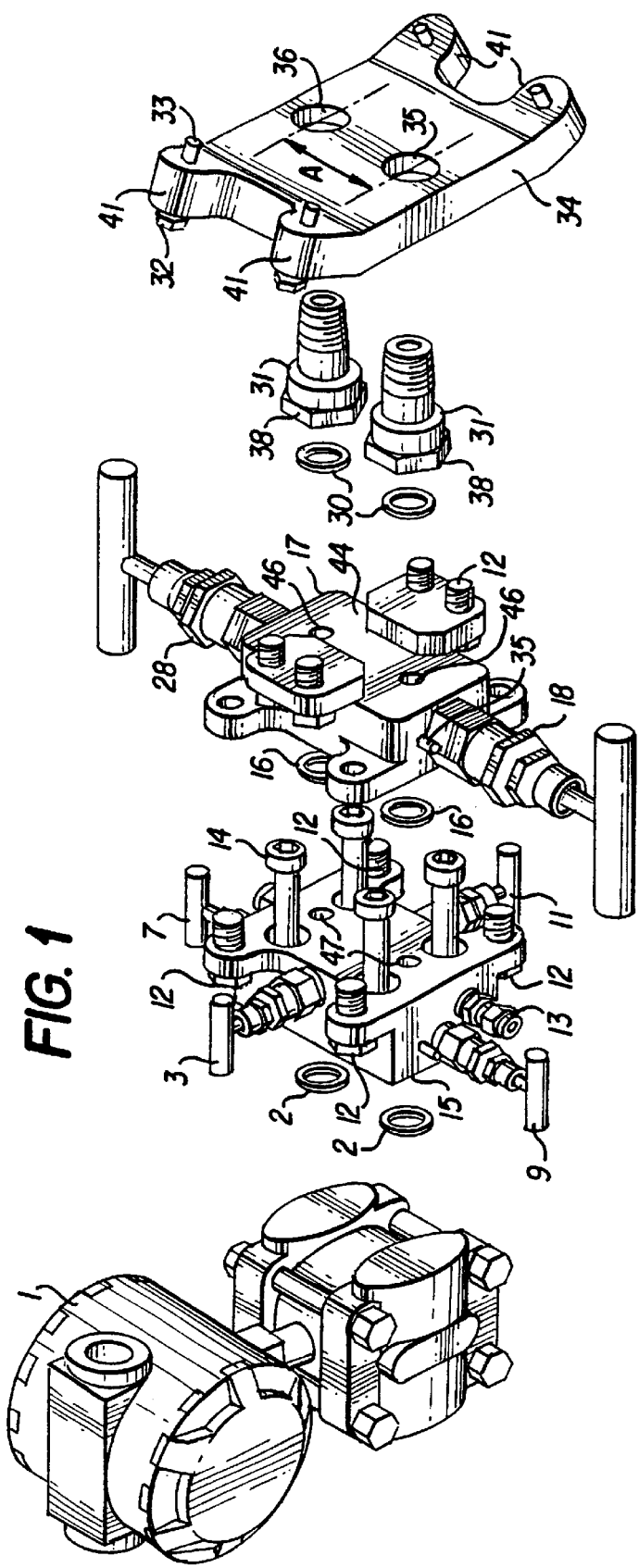
FIG. 1 is an exploded view of a typical transmitter and block manifold assembly for use with the saddle of the invention.

The apparatus of the invention can best be understood by reference to FIG. 1 in which a transmitter module 1 is placed in fluidly coupled connection with a pair of taps 31 representing the high and low pressure (or upstream and downstream sides, respectively) on either side of an orifice plate in a pipeline (not shown).

Block manifold assembly 17 and transmitter manifold assembly 15 generally shown in FIG. 1 complete the fluid connection between transmitter module 1 and taps 31, generally ½" NPT threaded.

In order to provide a stable platform on which to mount the transmitter assembly, an orifice saddle 34 is provided.

The device is assembled as follows. The taps 31 are inserted through holes 35, 36 in the orifice saddle 34. The orifice saddle 34 includes one round hole 35 for the NPT taps and one elongated hole 36. The elongated hole 36 is to allow for variation between the center to center spacings of the orifice taps in either the orifice flange or the orifice fitting. The distance between the orifice taps is conventionally 2⅛", however this spacing can vary somewhat. The slot A in the orifice saddle allows for center to center spacings between 2" and 2¼".

Figure 3:
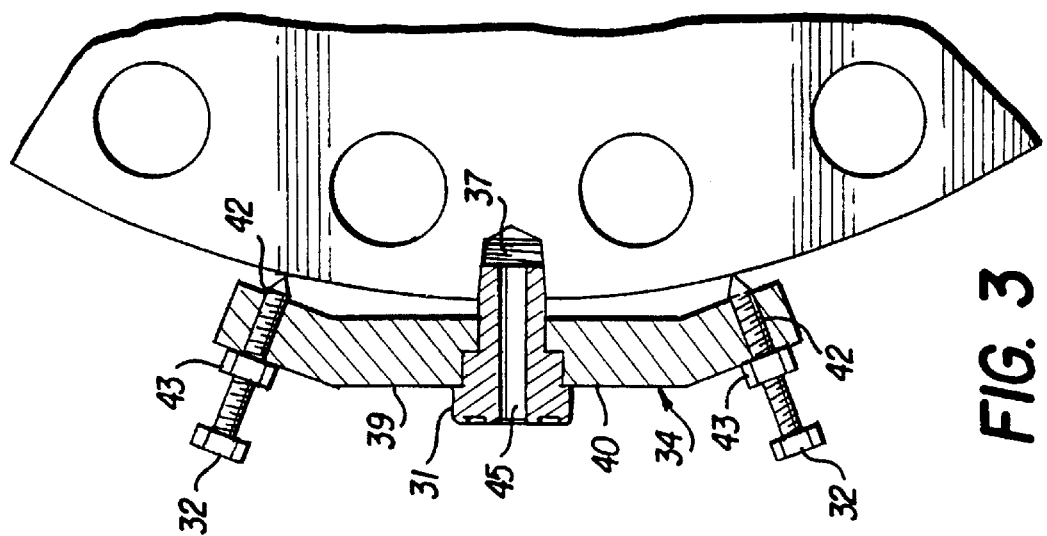
FIG. 3 is an enlarged view of FIG. 2 to show detail thereof.
Figure 2:
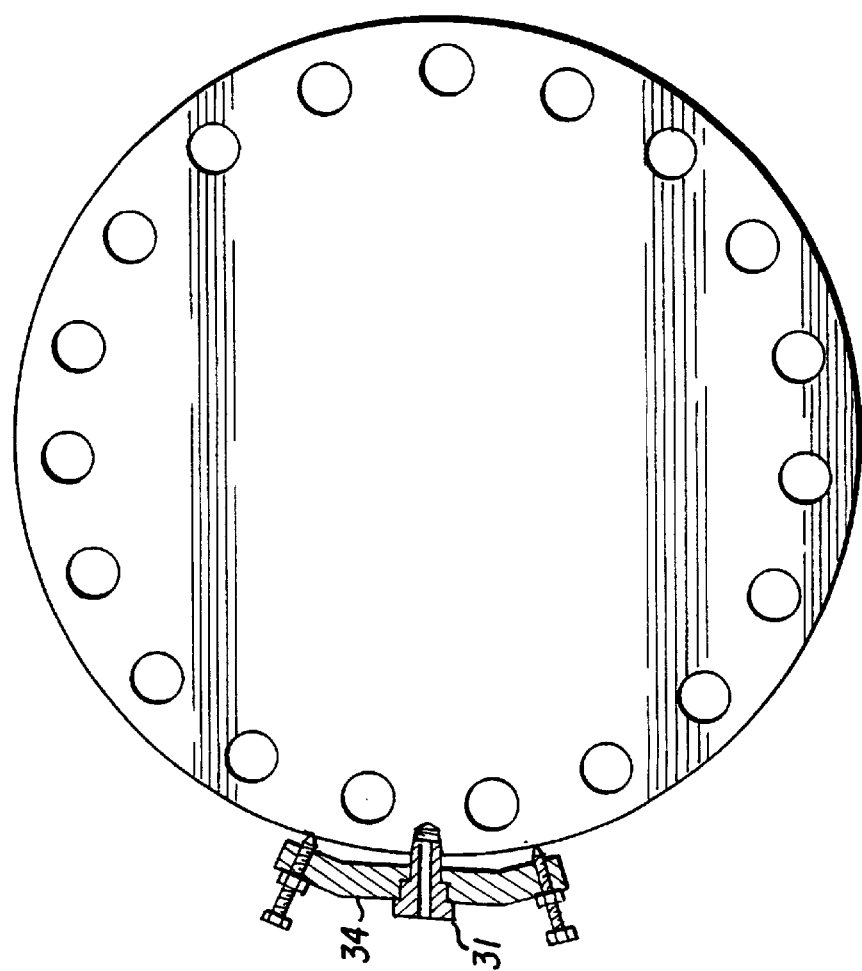
FIG. 2 is a schematic cross sectional view of the saddle assembled on a 12" 600# flange.
Figure 4:
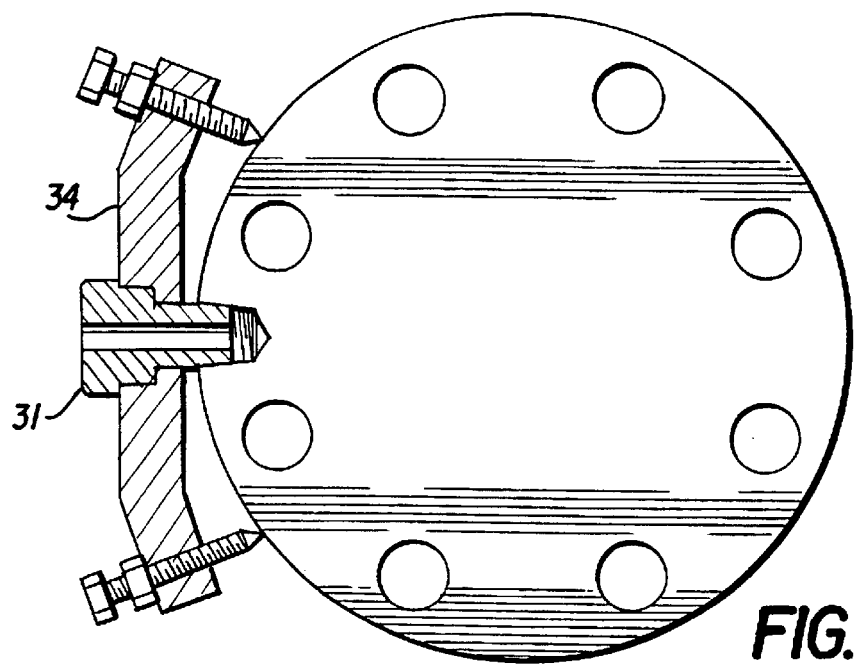
FIG. 4 is a schematic cross sectional view of the saddle of FIGS. 2–3 assembled on a 3" 600# flange.

The taps 31 are tightened into the ½" NPT holes in the orifice fitting or orifice flange 37 (See FIG. 3). Once the taps 31 are fitted pressure tight and have been checked to ensure that the hex end 38 of the taps 31 are approximately in the same plane, the orifice saddle 34 is drawn up towards the hex end 38 of the taps 31. The hex end 38 of the taps 31 is larger than the threaded end. There is a shelf 39 (FIG. 3) machined in the tap hole. 40 in the orifice saddle 34. The tap 31 bears on the shelf 39 in the orifice saddle 34.

The orifice saddle 34 is machined with four lobes 41, each containing a threaded hole 42 (See FIG. 3). A stabilizing bolt 32 is threaded through each hole 42. As the bolts 32 are threaded through the orifice saddle 34 they bear on the orifice flange or the orifice fitting 37 (See FIG. 3). The bolts 32 press the orifice saddle 34 against the taps 31. When fully tightened the orifice saddle 34 now becomes a stable platform to attach the rest of the assembly. The loads imposed by the saddle 34 and the balance of the assembly is also transferred along the bolts 32 and to the orifice fitting or flange 37 (See FIG. 3). Thus, some of the load on the taps 31 has been relieved. The stabilizing bolts 32 can be locked in place using either locknuts 43 on the stabilizer bolts 32 or grub screws (not shown) installed through the side of the lobes 41 on the orifice saddle 34.

The block manifold 17 assembly is then bolted directly to the orifice saddle 34, using 4 bolts 12. There is a pressure tight seal between the hex end 38 of the taps 31 and the bottom 44 of the block manifold 17 using teflon gaskets 30. There is a single ⅜" bore 45 (See FIG. 3) through each tap 31. Those ⅜" bores 43 line up with the corresponding ⅜" bores 46 provided in the block manifold 17. Each ⅜" bores 46 in the block manifold is controlled by a conventional block valve assembly 18, 28. When the manifold assembly 17 is securely bolted to the orifice saddle 34 its' top surface (not visible) proves a stable platform to attach the transmitter manifold 15.

Two gasket grooves (not visible) are provided in the top surface (not visible) of the block manifold 17 around the outlet of each ⅜" bore 46. Teflon gaskets 16 are inserted into these grooves to provide the pressure tight seal between the block manifold assembly 17 and the transmitter manifold 15 assembly. The transmitter manifold 15 (with transmitter 1 mounted) is attached to the block 17 manifold with 4 bolts 12. There are two ⅜" bores 47 straight through the transmitter manifold 15 which match to the ⅜" bores 46 in the block manifold 17 on one side and to the transmitter process connections (not shown) on the other side.

The transmitter 1 is attached to the transmitter manifold 15 using 4 socket bolts 14. The transmitter shown in this embodiment is a Rosemount 1151 . This transmitter has a 2⅛" spacing between the high and low pressure inlets. Transmitters from other manufacturers can be attached to this device. Transmitters with other center to center spacings between the high and low side can also be attached to a modified version of this device. The transmitter 1 must be attached to the transmitter manifold 15 before the transmitter manifold 15 is attached to the block manifold 17.

The transmitter manifold 15 can be fitted with various valves as required by the specific application. The transmitter manifold 15 shown has a total of four valves 3, 7, 9, 11. Two of the valves 7, 9 are equalizer valves. These valves 7, 9 control the flow of gas between the high pressure side and the low pressure side. It is necessary to allow the high pressure side and the low pressure side of the assembly to communicate with each other to allow for calibration of the transmitter 1. The natural gas industry requires two equalizer valves to minimize the potential for any pressure leakage between the high pressure side and the low pressure side when the transmitter is in use. Such leakage, if it were to occur, would impair the accuracy of the flow measurements. The other two valves 3, 11 are vent valves. In the configuration shown these vent valves permit each side (high pressure or low pressure) to be vented or purged separately. The vented gas of other fluids exits the assembly through a ¼" NPT outlet. A standard commercially available NPT to tube fitting connection 13 can be installed in the ¼" NPT outlet if it is necessary to capture the vented gas or fluid.

The internal flow passages of the transmitter manifold can be modified to allow for any number of different combinations of equalizer and vent valves, e.g. 1 equalizer and no vents, 1 equalizer and 1 vent, 1 equalizer and 2 vents, 2 equalizers and no vents, 2 equalizers and 1 vent, etc.

The device as shown allows for a ⅜" bore straight from the orifice tap 31 through the transmitter 1. The distance between the orifice taps 31 and the transmitter has been minimized and although no dimensions are shown, the distance is approximately 4½". The orifice saddle 34 arrangements allows for a stable platform for the balance of the assembly, transfers load away from the NPT taps 31 and onto the orifice fitting or orifice flange. As shown in FIG. 3, each adjustable foot 32 is in the form of a bolt which has a foot axis angled with respect to a central axis of the tap 31. According to the method of the invention, bolts 32 are adjusted to move the orifice saddle away from the conduit and to transfer the load from the tap to the feet and thereby relieve the load on the NPT threads. Each foot is preferably angled such that the foot axis is substantially perpendicular to the engaging surface of the conduit, as shown in FIG. 3. The arrangement, because of the stabilizing effect of the bolts through the orifice saddle bearing on the orifice flange or fitting 37 (See FIG. 3) and minimizes the effects of vibration on the mounted assembly.

In an alternative embodiment, where the orifice fitting 50 (FIGS. 5 and 6) does not provide sufficient area adjacent threaded orifices 51, 52 to mount the orifice saddle 34 directly a lower plate 53 can be employed through which taps 31 pass.

In such a case, the stabilizer bolts 32 can then bear upon lower plate 53 by means of an upper plate 54 which places taps 31 in tension thereby forming a stable platform upon which to mount the remaining assembly.

Figure 5:
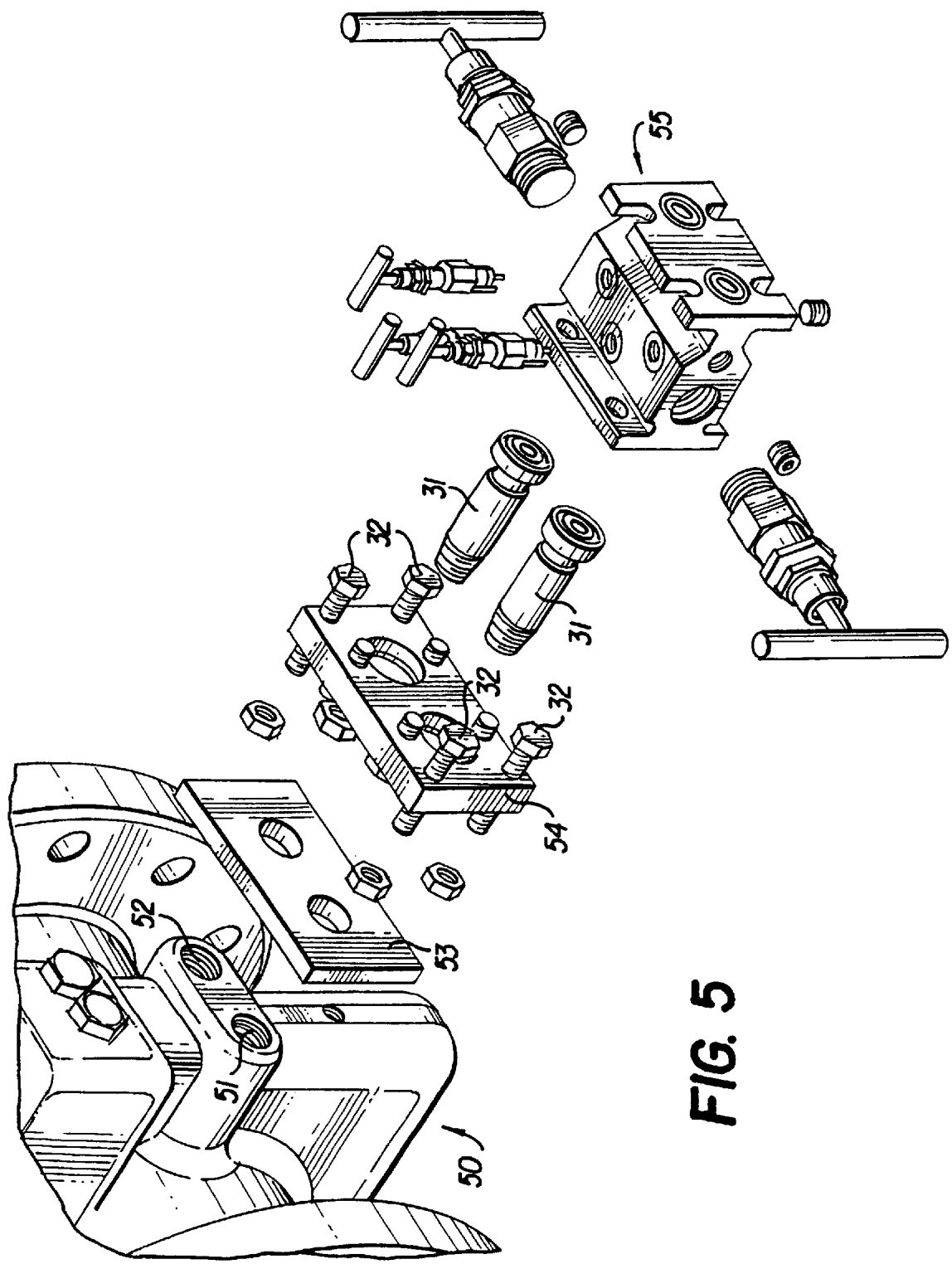
FIG. 5 is an exploded view of an alternative orifice fitting assembly showing use of a lower plate in connection with the saddle of the invention.
Figure 6:
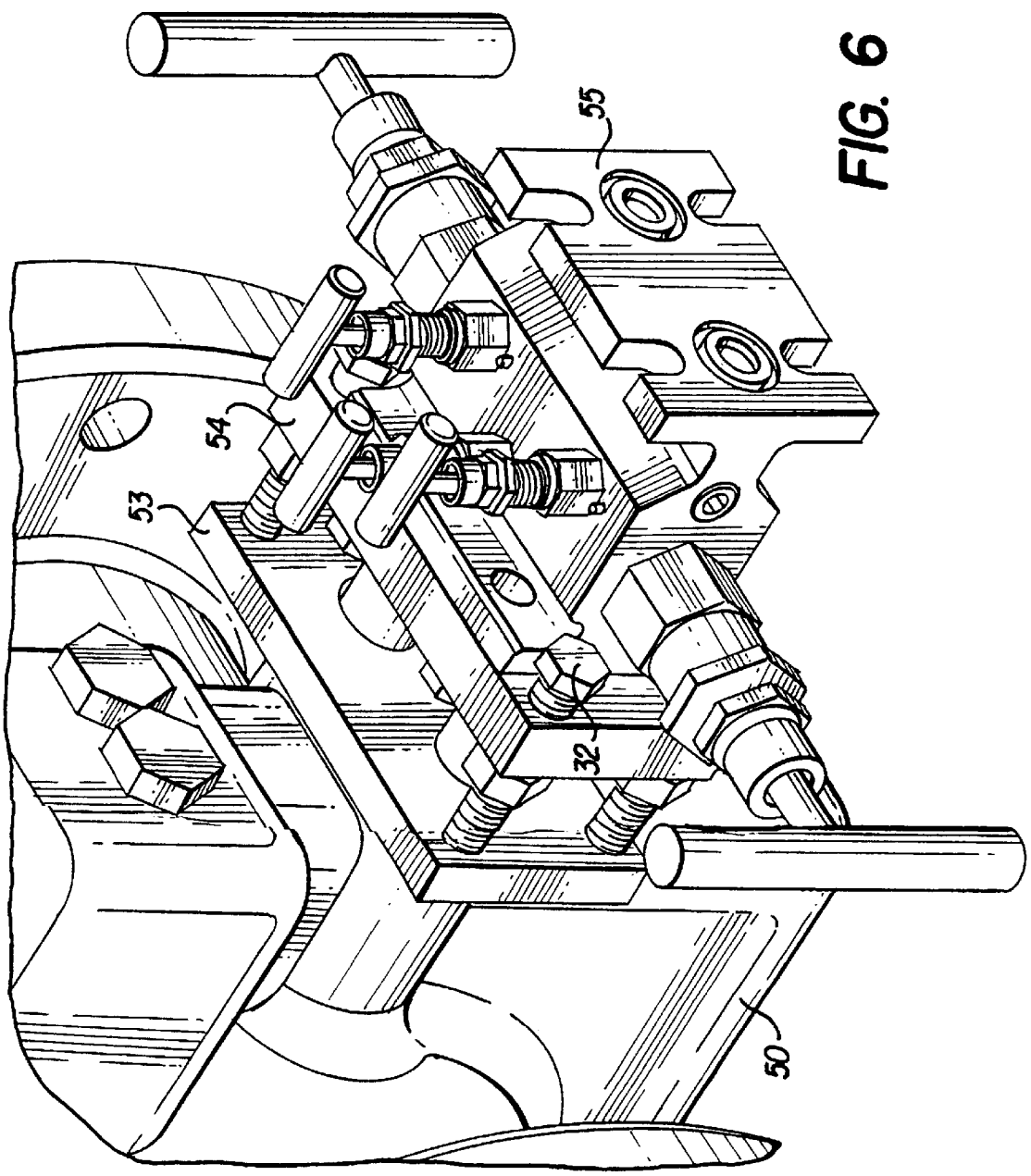
FIG. 6 is a schematic representation of FIG. 5 in assembled form.

Other types of manifold such as the five valve manifold 55 of FIGS. 5–6 may be used instead of the manifolds 15, 17 of FIGS. 1–4.

A further embodiment of the stabilized mounting assembly is shown generally in FIGS. 8–19. (Similar elements in different embodiments utilize the same numbering system throughout the views.).

Figure 7:
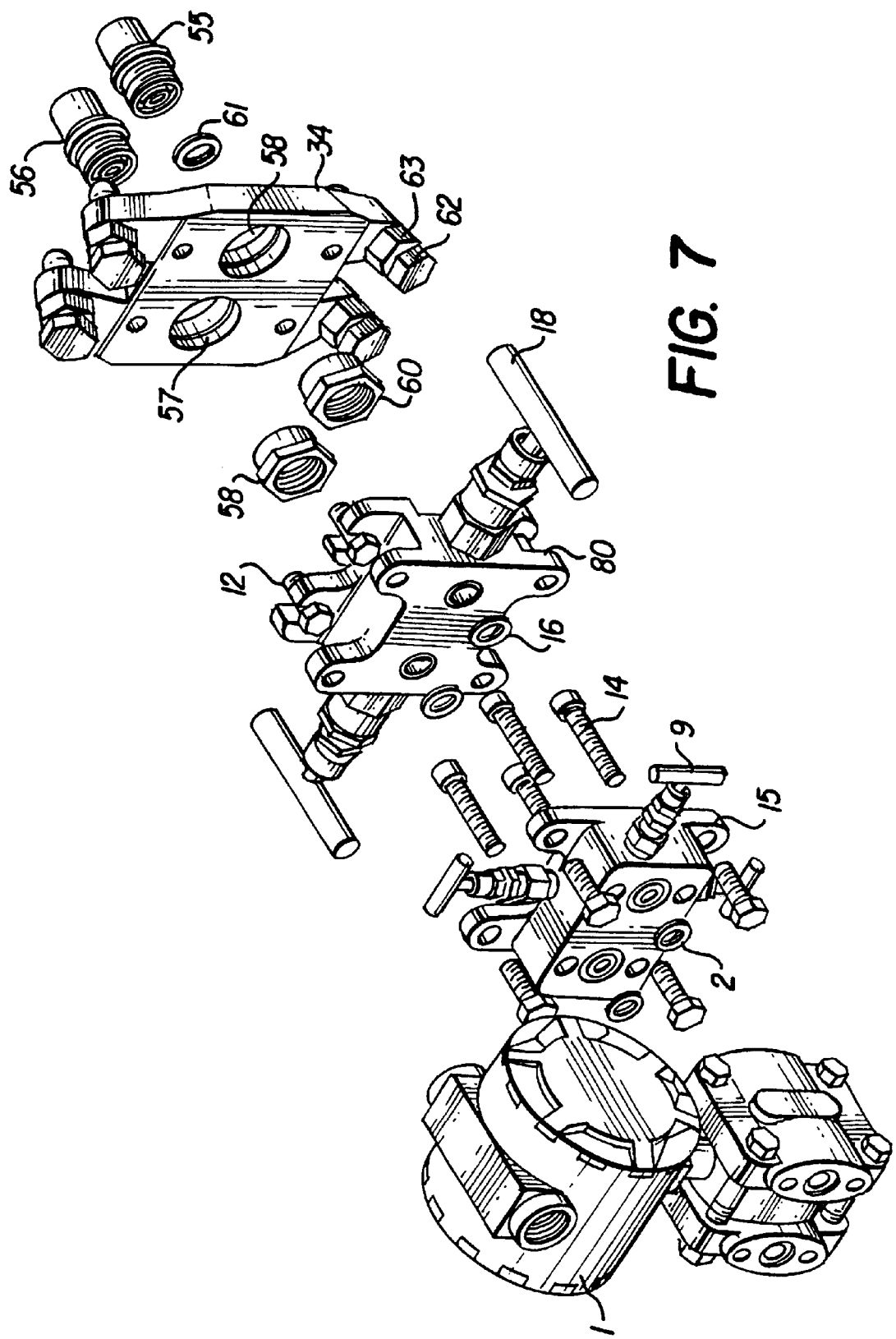
FIG. 7 is an exploded view of a typical transmitter and block assembly for use with a second embodiment of the invention.

Turning now to FIG. 7, the orifice saddle 34 is provided with ½" socketweld taps 55, 56, which pass through apertures 57, 58, in orifice saddle 34, so as to mate with socketweld tap nuts 59, 60. Seals (only one of which is shown) 61 are captured between the socketweld taps 55, 56 and block manifold 80 (FIG. 7) to fluidly seal them together. A plurality of stabilizing bolts 62 is optionally provided with a lock nut 63 to adjustably position orifice saddle 34.

Figure 8:
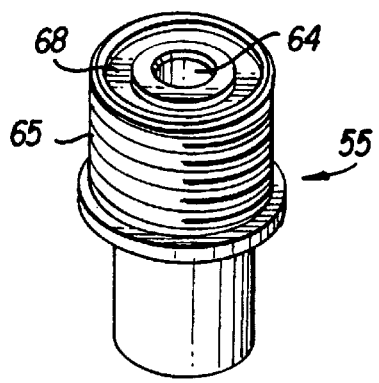
FIG. 8 is a perspective view of a ½" socketweld tap.
Figure 9:
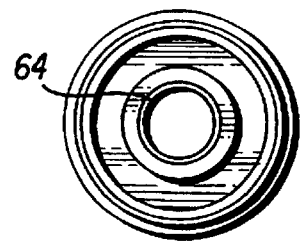
FIG. 9 is a top view of FIG. 8.
Figure 10:
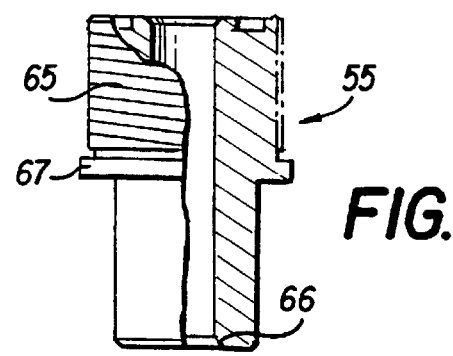
FIG. 10 is a side view partially sectional of the tap of FIG. 8.

FIGS. 8–10 show an enlarged view of socketweld tap 55 (56 being similar) provided with a through aperture 64 and a sealing well 68 into which seal 61 is positioned. A lip 67 is provided to engage with the lower portion of saddle 34 which is held snug by interfitting tap nut 60 with the threads 65 of tap 55. Tap 55 is optionally provided with a chamfer at 66.

Figure 19:
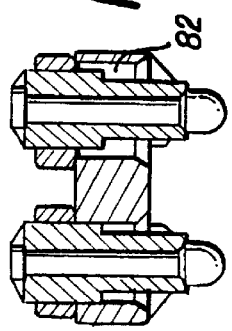
FIG. 19 being a sectioned view of FIG. 18.
Figure 18:
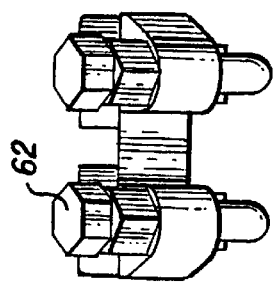
FIG. 18 is an enlarged view of the stabilizer bolts of FIG. 17.
Figure 11:
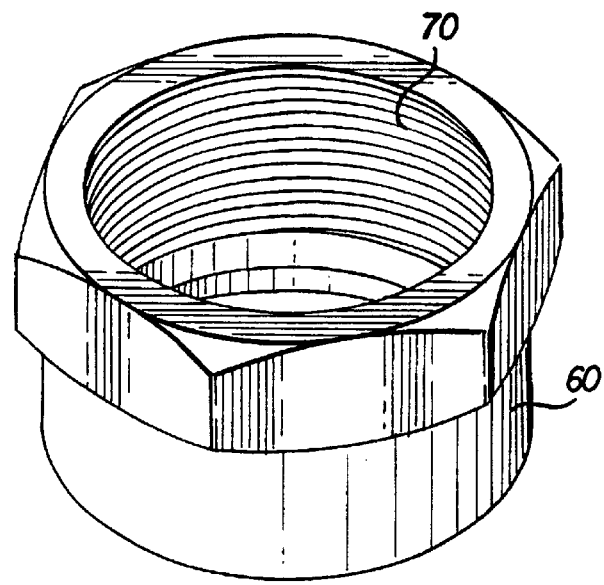
FIG. 11 is a perspective view of a socketweld tap nut designed to interfit with the ½" socketweld tap of FIG. 8.
Figure 12:
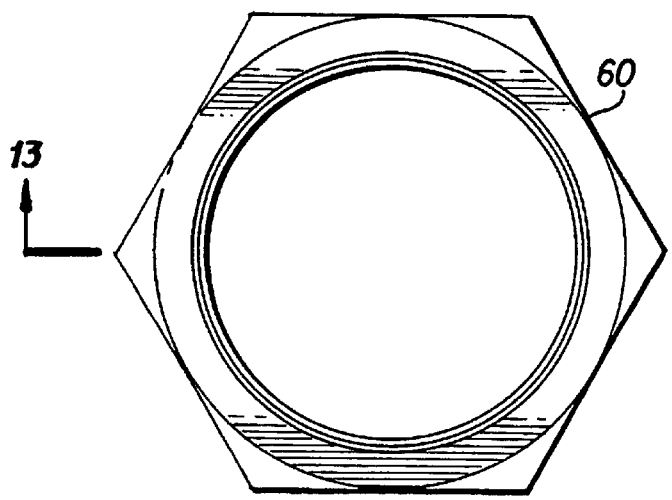
FIG. 12 is a top view of the tap nut of FIG. 11.
Figure 13:
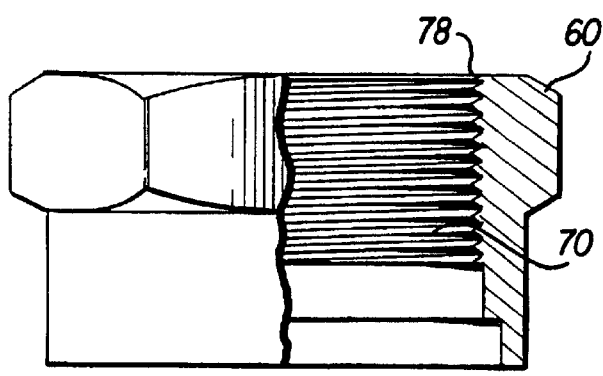
FIG. 13 is a side view, partially sectional of the tap nut of FIG. 11.
Figure 14:
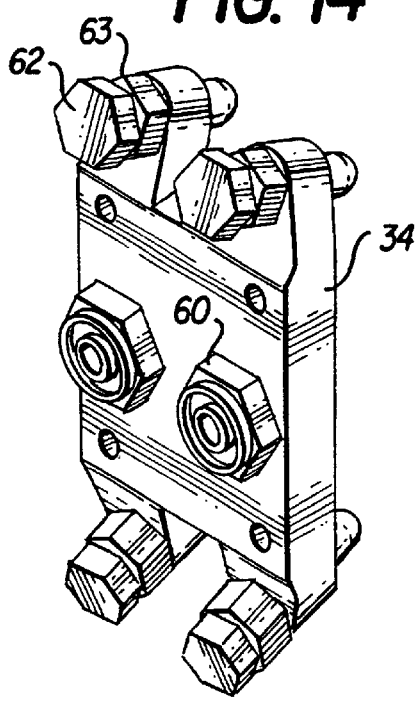
FIG. 14 is a perspective view of the assembled socketweld tap and tap nut in combination with the saddle of the second embodiment of the invention.
Figure 15:
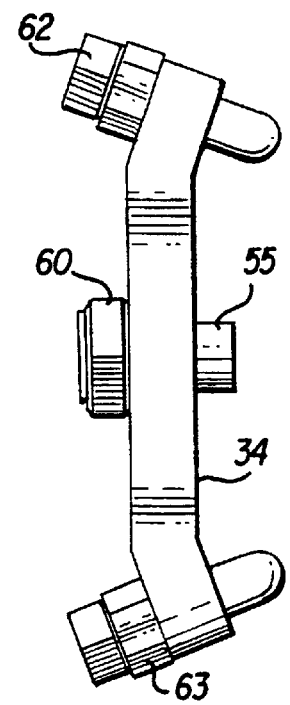
FIG. 15 being a side view of FIG. 14.
Figure 16:
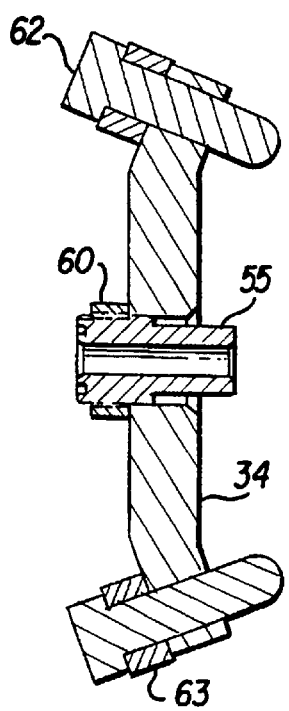
FIG. 16 being a side, sectioned view of FIG. 14.
Figure 17:
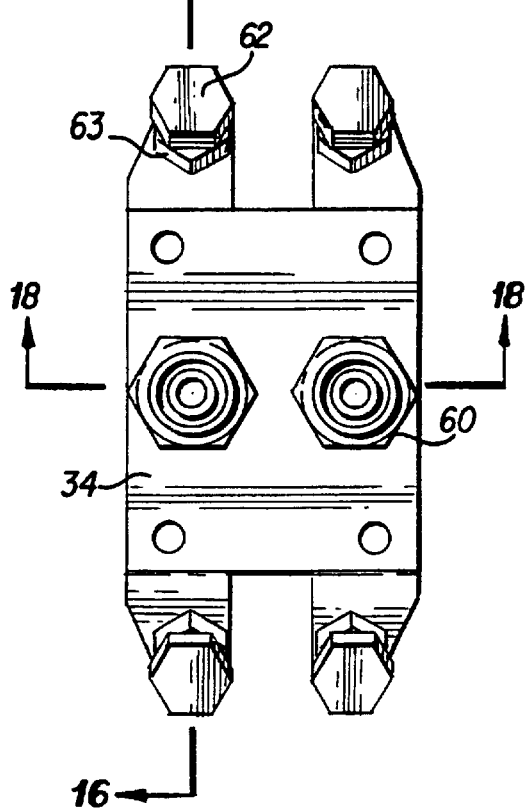
FIG. 17 being an end view of FIG. 14.

As seen in FIGS. 11–13 tap nut 60 is provided with internal threads 70 so as to threadedly engage with threads 65 of tap 55. Tap nut 60 is optionally counterbored at 78, so as not to contact block manifold 80 (FIG. 7). FIG. 19 shows, at 82, an elongated slot for adjustment of the saddle 34.

Enlarged and sectional views of the saddle 34 are shown in FIGS. 14–19.

I claim:

1. A stabilized mounting assembly for sensing pressure in a conduit having at least one pressure tap therein, said assembly comprising
    (a) at least one NPT threaded tap having a tap axis to fit a pressure tap in said conduit, an end of said tap distal from the NPT thread being of a size larger than said NPT threaded end;
    (b) an orifice saddle, said saddle defining at least one tap opening therethrough to permit said at least one NPT threaded end to protrude therefrom, but not larger than the size of said distal end of said tap; and
    (c) adjustable feet supported on the orifice saddle to move said orifice saddle away from said conduit so as to transfer the load from the NPT threaded tap to said adjustable feet and relieve the load on said NPT threads, each adjustable foot having a foot axis angled with respect to the tap axis.

2. The stabilized mounting assembly of claim 1, wherein said end distal from the NPT threads is a hex shaped end.

3. The stabilized mounting assembly of claim 2, wherein the hex shaped end is a hex shaped nut internally threaded to engage threads on said distal end of said tap.

4. An orifice saddle comprising a plate having two spaced tap openings therein, each tap opening being sized and positioned to permit a respective NPT threaded pressure tap having a tap axis to extend therethrough so as to threadedly engage the pressure taps in a pipeline on the high and low pressure side of an orifice plate in said pipeline;
    said orifice saddle further comprising a generally planar parallelpiped plate surrounding said openings; and
    at least two adjustable feet on the orifice saddle, each adjustable foot having a foot axis angled with respect to the tap axis.

5. The orifice saddle of claim 4, wherein said adjustable feet are located on lobed portions of said parallelpiped plate.

6. The orifice saddle of claim 5, wherein said adjustable feet comprise at least four adjustable feet.

7. The orifice saddle of claim 4, wherein said two openings are of dissimilar shape, one being circular in cross section and the other being an elongated configuration.

8. The orifice saddle of claim 4, wherein said pressure taps are pressure taps in an orifice fitting, and comprising in combination a second plate defining apertures therein through which said NPT threaded pressure taps may pass, said adjustable feet of said orifice saddle contacting said second plate.

9. The orifice saddle of claim 4, wherein said openings allow for center to center spacing between 2 inches and 2.25 inches.

10. The NPT threaded tap of claim 2, wherein said hex shaped end is a hex shaped nut having internal threads which engage external threads on an end of said tap remote from said NPT threaded end.

11. The NPT threaded tap of clam 10, further comprising a shoulder intermediate said NPT threaded end and said external threads.

12. A method of transferring the load from the threads of an NPT threaded tap to a conduit, comprising:
   providing an orifice saddle having at least one tap opening therethrough;
   passing the NPT threads on the tap through the at least one tap opening;
   thereafter threading the tap to the fluid conduit; and
   adjusting feet to move said orifice saddle away from the conduit and to transfer the load from the tap to the feet and relieve the load on the NPT threads, each adjustable has a foot axis angled with respect to the tap axis.

13. The method of claim 12, wherein the taps are placed in tension by forcing the end of the tap, remote from said NPT threads, in a direction away from said NPT threads.

14. The method of claim 13, wherein said tension is created by engaging an orifice saddle with said end of the tap remote from said NTP threads and forcing said saddle away from the NTP threaded end of said tap.

15. The stabilized motor assembly of claim 1, wherein the orifice saddle includes a plate portion surrounding the tap opening and substantially perpendicular to the tap axis; and
   a left side lobe secured to the plate portion and angled toward the conduit relative to the plate portion and a right side lobe secured to the plate portion and angled toward the conduit relative to the plate portion.

16. The stabilized motor assembly of claim 15, wherein each lobe includes a foot opening for receiving a respective adjustable foot, the thread opening having an opening axis substantially aligned with the foot axis.

17. The stabilized motor assembly of claim 15, wherein each of the adjustable feet is threadably connected to the orifice saddle.

18. The stabilized motor assembly of claim 17, wherein each adjustable foot has a torque engaging surface spaced opposite the orifice saddle with respect to the conduit.

19. The stabilized motor assembly of claim 1, wherein each foot axis is substantially perpendicular to an engaging surface on the conduit for engagement with the foot.

20. The method of claim 12, wherein each foot axis is substantially perpendicular to an engaging surface on the conduit for engagement with the foot.

* * * * *